United States Patent [19]

Hyatt

[11] 3,989,806

[45] Nov. 2, 1976

[54] LOW TEMPERATURE CATALYTIC OXIDATION OF CHLORINATED ORGANIC COMPOUNDS TO RECOVER CHLORINE VALUES

[75] Inventor: David E. Hyatt, Golden, Colo.

[73] Assignee: Vulcan Materials Company, Birmingham, Ala.

[22] Filed: Feb. 10, 1975

[21] Appl. No.: 548,769

[52] U.S. Cl. ............................... 423/502; 423/481; 423/488; 423/437
[51] Int. Cl.$^2$ .......................................... C01B 7/02
[58] Field of Search .......... 423/462, 481, 488, 502, 423/437

[56] References Cited

UNITED STATES PATENTS

| | | | |
|---|---|---|---|
| 2,395,314 | 2/1946 | Blumer | 423/502 |
| 2,832,670 | 4/1958 | Wollthan | 423/481 |
| 3,310,380 | 3/1967 | Lester | 423/502 |
| 3,314,753 | 4/1967 | Richert et al. | 423/488 X |
| 3,360,483 | 12/1967 | Diamond et al. | 423/502 X |
| 3,376,113 | 2/1968 | Frevel et al. | 423/481 X |
| 3,407,039 | 10/1968 | Bryant | 423/502 |
| 3,453,073 | 7/1969 | Sims | 423/481 |
| 3,705,010 | 12/1972 | Davis et al. | 423/502 |

FOREIGN PATENTS OR APPLICATIONS 550,453   1/1943   United Kingdom

OTHER PUBLICATIONS

J. W. Mellor's "A Comp. Treatise on Inorganic and Theoretical Chemistry," vol. 2, 1922 Ed., pp. 66, 67, Longmans, Green & Co., N.Y.

*Primary Examiner*—Edward Stern
*Attorney, Agent, or Firm*—Burns, Doane, Swecker & Mathis

[57] ABSTRACT

Substantially all of the chlorine values, e.g., chlorine, are recovered from reactant feeds of chlorinated organic compounds, e.g., hexachlorobenzene and hexachlorobutadiene, by catalytic oxidation at temperatures below about 500° C through the use of transition metal-containing supported catalysts, preferably copper-exchanged zeolite A, X or Y.

20 Claims, No Drawings

LOW TEMPERATURE CATALYTIC OXIDATION OF CHLORINATED ORGANIC COMPOUNDS TO RECOVER CHLORINE VALUES

BACKGROUND OF THE INVENTION

1. Field of the Invention

This invention relates to the oxidation of chlorinated organic compounds to recover chlorine values.

2. Summary of the Prior Art

Producers of highly useful chlorinated organic compounds such as perchloroethylene, carbon tetrachloride, chloroprene, and vinyl chloride are faced with serious disposal problems with respect to the undesirable chlorinated organic by-products that are formed in the reactions. Processes employing chlorine-containing compounds as intermediates, such as making propylene oxide by the chlorohydrin route, also produce unwanted by-products. By-products which may be formed singularly or in various combinations include materials such as hexachloroethane, hexachlorobutadiene, hexachlorobenzene, and various $C_3$ and $C_4$ chlorinated organic compound mixtures. A typical disposal method for the undesirable chlorinated aromatic by-products currently consists primarily of terrestrial burial. Also used are ocean discharge, open pit burning, drum burial, and deep-well disposal. These methods, however, have engendered serious criticism as being dangerous to the environment. In addition, these methods may be economically unattractive because the cost of the undesirable chlorinated by-products being disposed is not diminished at least in part by recovery of some material of significant economic worth. Incineration of the undesirable chlorinated by-products by means of high performance burners or furnaces has also been proposed. Such proposal is disclosed, for example, in an article in *Chemical Week*, Apr. 19, 1972, pages 37 and 38, and French Pat. No. 1,326,053. Also British Pat. No. 1,002,008 discloses a process for recovering the chlorine from chlorocarbon residues, such as produced in the above-mentioned processes, by burning these residues at an elevated temperature with oxygen or free oxygen containing gases. This process, however, requires the utilization of temperatures between about 700° and 1300° C. These high temperatures require special equipment that is stable at such temperatures and will resist corrosion by the chlorine, HCl and water produced, thus increasing capital expenditures and maintenance costs. Similarly, U.S. Pat. No. 3,548,016 discloses an involved multistep process for recovering chlorine values from certain chlorinated hydrocarbons by first burning, then reacting the combustion effluent with a salt mixture of cuprous chloride and copper oxychloride, and then reacting the resulting salt mixture with chlorinated hydrocarbon.

OBJECTS AND SUMMARY OF THE INVENTION

Accordingly, a primary object of the present invention is to provide a process for the recovery of chlorine values from chlorinated organic compounds which process substantially alleviates the above-discussed disadvantages of the prior art, or does not incur them altogether.

A more particular object of the present invention is to provide novel processes for the recovery of substantially all of the chlorine values from chlorinated organic compounds, which processes can be performed at relatively low temperature.

Another object of the present invention is to provide a relatively low temperature process for the recovery of chlorine from chlorocarbons, which process does not involve the intermediate conversion of these chlorocarbons to hydrochloric acid.

A further object of the present invention is to provide a low temperature process for the recovery of chlorine from waste chlorocarbon residues.

In accordance with one aspect of the present invention, a catalytic process for the recovery or production of chlorine values from chlorinated organic compounds is provided, which process comprises catalytically oxidizing a chlorinated organic compound feed consisting essentially of chlorinated organic compounds by reacting the chlorinated organic feed with oxygen or an oxygen-containing gas at a reaction temperature of below about 500° C and in the presence of at least one transition metal-containing supported catalyst for a time sufficient to recover substantially all of the chlorine values from the chlorinated organic compound feed.

In another more particular aspect of the present invention, a catalytic oxidation process for the recovery of chlorine from a chlorocarbon feed mixture is provided, which process comprises forming a chlorocarbon feed mixture consisting essentially of hexachlorobenzene, hexachlorobutadiene and hexachloroethane, passing the chlorocarbon feed mixture and more than a stoichiometric amount of oxygen relative to the chlorocarbons into a reaction zone containing a fluidized bed consisting essentially of at least one transition metal-containing supported catalyst in particulate fluidizable form, a catalytic amount of the catalyst being supported on a carrier having a surface area of at least about 50 m$^2$/gm, and maintaining a superficial linear velocity of the chlorocarbons and oxygen fed into the reaction zone above minimum fluidization velocity for the bed and a reaction zone temperature between about 300° and 500° C and a reaction zone pressure between about 0.5 atm and about 10 atm (absolute), for a superficial reaction zone residence time of between about 2 seconds and 2 minutes and sufficient to oxidize essentially all of the chlorocarbon feed mixture to chlorine and carbon dioxide reaction products.

A central feature of the present invention is the surprising discovery that substantially all of the chlorine values can be directly recovered at relatively low temperatures, i.e., below about 500° C, from a chlorinated organic compound feed, such as a chlorocarbon feed consisting essentially of hexachlorobenzene, hexachlorobutadiene and hexachloroethane, through the use of certain catalysts. The catalysts found useful for this purpose are transition metal-containing supported catalysts, preferrably copper-exchanged zeolite. In the past, as indicated above, chlorinated organic material by-products have been buried on land or at sea, or have been incinerated or burned at high temperatures. The low reactivities of these chlorinated materials were thought to require, in general, strenuous reaction conditions to convert these materials to more useful products, and carbon deposition on the catalyst or catalyst volatilization losses may have also in the past been thought by workers in this field to be deterrents to a useful catalytic process.

These and other objects, aspects and advantages of the present invention will become more fully apparent to one skilled in the art from the following description of the preferred embodiments.

DESCRIPTION OF THE PREFERRED EMBODIMENTS

The chlorinated organic compounds which are reacted with oxygen or oxidized to recover or produce useful chlorine values in the process of the present invention may be divided into two classes.

The first class, chlorocarbons or mixtures thereof, are defined herein as compounds or mixtures containing only carbon and chlorine, or only carbon, chlorine and oxygen. Such compounds includes, for example, hexachlorobenzene, hexachlorobutadiene, and hexachloroethane. Mixtures of such chlorocarbons, commonly called "hex pot bottoms" are unwanted by-products recovered as residual heavy still bottom materials from high temperature perchlorination reactions such as the thermal chlorination of propane, propylene, ethylene dichloride, propylene dichloride, and the like, to make perchloroethylene and carbon tetrachloride. Such a chlorocarbon stream is a most preferred starting material for the present invention although the process of the present invention is suitable for production of chlorine by the reaction of other chlorocarbons, regardless of their source. For example, such other chlorocarbons may include aliphatic and aromatic chlorocarbons of from 1 to about 20 carbon atoms, and more typically from 2 to 12 carbon atoms, per chlorocarbon molecule. Non-limiting examples of such other chlorocarbons include carbon tetrachloride, perchloroethylene, hexachlorocyclopentadiene, octachlorocyclopentene, octachlorostyrene, octachlorodibenzodioxin and decachlorobiphenyl.

The second class, chlorinated hydrocarbons or mixtures thereof, are defined herein as compounds or mixtures containing only carbon, chlorine and hydrogen, or only carbon, chlorine hydrogen and oxygen. Such chlorinated hydrocarbons may be lower molecular weight materials, e.g., may contain from 1 to about 30 carbon atoms, and more typically from 2 to 8 carbon atoms, or such chlorinated hydrocarbons may be of higher molecular weight, i.e., chlorine-containing polymers or resins having a molecular weight of from about 5,000 to about 1 million. Nonlimiting examples of such chlorinated hydrocarbons include the various geometric isomers of benzene hexachloride, tetrachlorobutenes, trichloropropenes, waste materials from cracking of ethylene dichloride to vinyl chloride, dichloroethylene, trichloroethylene, trichloroethane, pentachlorobutane, hexachlorodibenzodioxin, tetrachlorobiphenyl, polyvinyl chloride and chlorinated polyethylene.

The above-described chlorinated organic compounds may be reacted in any convenient physical form. For example, the chlorinated organic compounds may be vaporized and mixed with oxygen or an oxygen-containing gas in the reaction zone or prior thereto. Chlorinated organic compounds which are not easily vaporizable, e.g., the above-described "hex pot bottoms", may be introduced into the reaction zone as a liquid in the form of, for example, droplets, mists or atomized jet. If necessary, chlorinated organic compounds which are normally solid at reaction temperatures or which sublime upon heating (such as hexachlorobenzene) may be dissolved in a liquid chlorocarbon prior to introduction into the reaction zone or may be introduced into the reaction zone as a slurry or as a solid.

The chlorinated organic compounds may be oxidized or reacted with oxygen or an oxygen containing gas at reaction temperatures of below about 500° C, and typically between about 300° C and 500° C, for a time sufficient to recover substantially all, e.g., at least about 80% and preferably above 90%, of the chlorine values from the chlorinated organic compound feed. For example, the superficial reaction zone residence time may be from several seconds to several hours, more typically from several seconds up to several minutes, e.g., from about 2 seconds up to about 2 minutes, and preferably is from about 5 seconds up to about 100 seconds, and most preferably from about 5 seconds up to about 50 seconds.

Atmospheric, subatmospheric or superatmospheric reaction pressures may be employed. The reaction pressures typically may be from about 0.5 atm absolute to about 15 atm absolute, more typically from about 0.5 atm absolute to about 10 atm absolute, and preferably are from about 1 atm absolute to about 6 atm absolute.

Oxygen may be supplied for the reaction in the form of pure oxygen gas or as an oxygen-containing gas such as air. The ratio of total feed of oxygen to total feed of chlorinated organic starting material is a highly variable number which depends upon the specific composition of the feed and other process design factors. The oxidation reaction is typically conducted with an amount of oxygen that varies from about the stoichiometric amount (calculated as the amount required to oxidize completely the chlorinated organic compounds to chlorine values and carbon dioxide, plus any contained hydrogen to water), and typically is from about stoichiometric to about 50% in excess of this amount. Preferably, the amount of oxygen varies from between the stoichiometric amount to 20% in excess of this amount.

As indicated above, the process of the present invention is conducted in the presence of at least one transition metal-containing supported catalyst.

Non-limiting specific examples of transition metals found useful include copper (Group IB), iron (Group VIII), manganese (Group VIIA) and chromium (Group VIA).

Preferably, the transition metal-containing supported catalyst is in particulate fluidizable form, and the catalyst is supported on a carrier having a surface area of at least about 50 m²g/, and more preferably at least about 200 m²/g.

One or more of the transition metals may be supported on the carrier in any suitable amount, as will be evident in view of the present specification to those skilled in this art. For example, the supported catalyst may contain, on a transition metal calculated basis, from about 0.1% to about 20%, and preferably from about 0.5 to 10% transition metal. Other co-catalysts, promoters or the like may also be present on the carrier if desired.

The process of the present invention is preferably conducted in the presence of a transition metal-exchanged zeolite, and most preferably copper-exchanged zeolite.

Zeolites are metal alumino-silicates which exist in crystalline form. The crystalline zeolites having the basic formula:

$$M_{2/n}O:Al_2O_3:xSiO_2:yH_2O$$

where M represents an exchangeable cation and n its valence, are termed zeolitic molecular sieves. In general, a particular crystalline zeolite will have values for x and y that fall within a definite range.

The fundamental "building block" of any zeolite crystal is a tetrahedron of four oxygen ions surrounding a smaller silicon or aluminum ion. Each of the oxygen ions has two negative charges; each silicon ion has four positive charges; each aluminum ion three. A silicon thus takes on a "half interest" in the eight charges of the four oxygens which surround it. Each oxygen retains one negative charge which enables it to combine with another silicon or aluminum ion and extend the crystal lattice in all directions. The aluminum ion, with one less positive charge than the silicon, can only satisfy three negative charges of the four oxygens which surround it. To produce a stable crystal structure, it must have the help of another positively charged ion. That is the function of the exchangeable cation M.

The structure of most crystals extends uniformly in all directions without leaving empty spaces. In zeolitic molecular sieves, however, the framework of silicon-oxygen and aluminumoxygen tetrahedra forms a structure which is honeycombed with relatively large cavities which are normally filled with water molecules. The size and shape of these cavities depends on the variety of the zeolite.

The zeolitic molecular sieves as described above may be activated by heating to effect the loss of water of hydradion. The dehydration results in crystals interlaced with channels of molecular dimensions that offer very high surface areas.

The zeolites occur as agglomerates of fine crystals or are synthesized as fine powders and are preferably tableted or pelletizied for use in the present invention.

Known naturally occurring crystalline zeolitic molecular sieve materials which may be useful as the solid adsorbent material in the present invention include analcite, erionite, chabazite, faujasite, and mordenite which are widely known and described in the art.

Known synthetic zeolite materials effective in the process of the present invention include hydrated sodium and calcium alumino-silicates of the above general formula where M generally represents sodium or calcium. However, the sodium or calcium may be replaced in whole or in part by other alkali or alkaline earth metal ions such as lithium potassium, rubidium, cesium, beryllium, magnesium, strontium or barium.

Suitable synthetic molecular sieve materials may include zeolites A, D, L, R, S, T, X, and Y.

The pore size of the zeolitic molecular sieves may be varied by employing different metal cations. For example, sodium zeolite A has a pore size of about 4 angstrom units whereas when calcium cations have been exchanged for at least about 40% of the sodium cations calcium zeolite A has a pore size of about 5 angstrom units.

Zeolite A is a crystalline zeolitic molecular sieve which may be represented by the formula

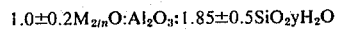

$$1.0 \pm 0.2 M_{2/n}O:Al_2O_3:1.85 \pm 0.5SiO_2 yH_2O$$

wherein M represents a metal, n is the valence of M, and y may have any value up to about 6. The as-synthesized zeolite A contains primarily sodium ions and is designated sodium zeolite A.

Zeolite A is described in greater detail in U.S. Pat. No. 2,882,243, while zeolite X is described in U.S. Pat. No. 2,882,244. Zeolite Y is described in U.S. Pat. No. 3,130,007, and zeolite R in U.S. Pat. No. 3,030,181. Zeolites D and T are described in U.S. Pat. Nos. 3,069,362 and 2,950,952, respectively. The disclosures of the above patents are incorporated herein by reference.

The zeolite material may be copper-exchanged in any convenient manner such as by cation exchange between the zeolite and an aqueous solution of a copper salt (e.g., copper nitrate) such as disclosed, for example, in U.S. Pat. No. 3,013,985. Other techniques for introducing chromium or copper into crystalline aluminosilicate zeolites may also be suitable and include, for example, ion exchanging the zeolite with a complex cation form of a metal. The exchanged form of the zeolite is then heated at elevated temperatures to decompose the complex and yield a catalytically active form of the metal in the inner absorption region of the zeolite.

Another technique for metal loading of crystalline aluminosilicate zeolites involves treating the zeolites with decomposable fluid metal compounds such as the copper carbonyls, carbonyl hydrides, acetyl acetonate complexes of copper in the zero valence state, reducible copper halides, copper alkyls and other copper-organic compounds such as cyclopentadienyl copper compounds and ethylenic complex compounds of copper.

These or any other suitable technique known to those skilled in the art may be used.

Copper-exchanged zeolite A, X or Y is the most preferred catalyst for use in the process of the present invention.

Other transition metal-containing catalysts include, for example, copper salts or oxides impregnated on a high surface area support, such as cupric chloride impregnated on finely divided attapulgite.

Chromium salts and oxides impregnated on a high surface area support, as described and claimed in a copending U.S. patent application filed on even date namely Ser. No. 548,776 in the name of Earnest L. Johnston and assigned to the assignee of the present invention, may also be used.

Other high surface area supports for impregnation of transition metals include activated alumina, silica, diatomaceous earths, Fuller's earth, Kieselguhr, pumice, asbestos, kaolin, bentonite, zeolites, and silica-aluminas.

Other methods for producing transition metal-containing supported catalysts may include, for example, co-precipitation of transition metal and alumina, or passing a vapor of transition metal compound into a fluidized bed of the carrier at elevated temperatures.

Other transition metal-containing supported catalysts are described, for example in U.S. Pat. Nos. 2,886,605; 3,013,985; 3,304,268; 3,407,039; 3,453,340; 3,461,084; 3,644,220; and 3,691,098, all of which are incorporated by reference.

While the transition metal-containing catalysts may be present in any shape, the process of the present invention is preferably performed utilizing a fluidized bed of at least one of these catalysts in particulate fluidizable form. For example, particulate fluidizable catalyst may vary from about 30 to about 400 mesh, more typically from about 100 to 400 mesh, and preferably from about 150 to 325 mesh (U.S. Standard Sieve Series).

Fixed catalyst beds may also be used, e.g., employing ¼ inch to 30 mesh particles.

When the catalyst is present in a fluidized or fixed bed, other inert particulate matter, e.g., Fuller's earth, pumice, and/or ceramic material may be mixed therewith.

The chlorine values, i.e., chlorine and any hydrogen chloride present, may be recovered from the reaction product stream by any suitable technique known to those skilled in the art. Thus, any hydrogen chloride may be absorbed in water, and the off gases containing chlorine and carbon dioxide may be dried, for example, by passage through a concentrated sulfuric acid drying tower, followed by absorption of the chlorine in a suitable solvent (e.g., carbon tetrachloride) followed by fractional distillation. Alternatively, the entire product stream may be used as a feed stream for another reaction, such as an oxychlorination reaction.

The present invention is additionally illustrated but not limited by the following examples; all parts, percentages and ratios indicated herein are by weight unless otherwise specified.

EXAMPLE I

A fluidized bed reactor was constructed of a 34 mm. diameter glass tube about 90 cm. high with a 60 mm. by about 15 cm. expanded section at the top. The reactor was wrapped with four separate electric heaters and insulated. The catalyst bed was 76 cm. deep. Each run was conducted at a pressure of about one atmosphere (absolute).

A number of runs were performed with different chlorocarbon feeds and copper-exchanged synthetic zeolite supports. The operating conditions used and percentage chlorine recovered are shown in TABLE I. (In the TABLES, runs which are outside the scope of the present invention but which are presented for comparison are indicated by a "C" in the run number.)

TABLE I (Fluidized Bed)

| Run No. | Feed | Feed Rate × 10⁻³ moles/min. | $O_2$/C Ratio | Average Reaction Zone Temp. °C | Residence Time, sec. | Catalyst % wt. Cu (II) loading/ type zeolite support | % (theoretical) $Cl_2$ recovered | Oxidant |
|---|---|---|---|---|---|---|---|---|
| 1 | $CCl_4^a$ | 12.78 | 1.30/1 | 407 | 8.75 | 6.60/13X$^d$ | 90.6 | Air |
| 2 | " | 11.29 | 1.47/1 | 446 | 8.38 | " | 97.6 | " |
| 3C | " | 11.18 | 1.49/1 | 321 | 10.1 | " | 12.4 | " |
| 4C | " | 11.18 | 1.49/1 | 359 | 9.5 | " | 31.15 | " |
| 5 | $C_4Cl_6^b$ | 1.577 | 2.64/1 | 431 | 9.6 | " | 93.1 | " |
| 6 | " | 2.266 | 1.84/1 | 496 | 8.8 | " | 87.05 | " |
| 7 | " | 8.744 | 1.57/1 | 502 | 12.8 | " | 100 | $O_2$ |
| 8 | HPB$^c$ | 1.035 | 2.97/1 | 509 | 13.4 | " | ~100 | " |
| 9 | " | 0.4106 | 8.04/1 | 499 | 12.8 | " | 95 | " |
| 10C | " | 0.9925 | 0.74/1 | 558 | 11.0 | " | 59.9 | Air |
| 11 | " | 0.5716 | 1.38/1 | 506 | 11.9 | " | ~100 | " |
| 12 | " | 0.3008 | 2.29/1 | 477 | 14.3 | " | ~100 | " |
| 13 | " | 0.6862 | 1.15/1 | 451 | 12.8 | " | 98.6 | " |
| 14 | " | 0.4216 | 1.88/1 | 472 | 12.9 | " | ~100 | " |
| 15 | " | 0.4223 | 1.63/1 | 471 | 14.8 | " | 94.3 | " |
| 16 | " | 0.3942 | 2.00/1 | 448 | 13.3 | " | 98.8 | " |
| 17 | " | 0.3907 | 2.02/1 | 440 | 13.4 | " | ~100 | Air |
| 18 | " | 0.3907 | 1.76/1 | 450 | 15.1 | " | ~100 | " |
| 19 | " | 0.6405 | 1.23/1 | 427 | 13.6 | " | ~91.6 | " |
| 20 | $C_4Cl_6^b$ | 3.049 | 1.22/1 | 430 | 10.3 | 4.50/13Y$^e$ | 98.7 | " |
| 21 | " | 3.345 | 1.11/1 | 397 | 10.9 | " | 80.1 | " |
| 22 | " | 3.345 | 1.11/1 | 401 | 10.9 | " | 82.6 | " |
| 23 | " | 3.345 | 1.11/1 | 422 | 10.5 | " | 90.3 | " |
| 24 | " | 3.345 | 1.11/1 | 439 | 10.3 | " | 97 | " |
| 25 | " | 3.312 | 1.12/1 | 444 | 10.3 | " | 99.8 | " |
| 26C | " | 3.289 | 1.13/1 | 475 | 9.8 | 3.63/13X$^d$ | 72.2 | Air |
| 27 | " | 2.939 | 1.26/1 | 456 | 10.1 | " | 83.6 | " |
| 28 | " | 2.971 | 1.25/1 | 529 | 9.2 | " | 99.4 | " |
| 29 | " | 3.440 | 1.08/1 | 461 | 9.0 | 6.6/13X$^d$ | 92.1 | " |
| 30 | " | 2.881 | 1.29/1 | 460 | 9.1 | " | 93.4 | " |
| 31 | " | 2.962 | 0.98/1 | 441 | 10.3 | 6.6/13X | 90.3 | " |
| 32 | " | 2.942 | 1.02/1 | 458 | 11.4 | 7.07/13X | 94.2 | " |
| 33 | " | 3.526 | 0.95/1 | 468 | 10.0 | " | 93.7 | " |

$^a$CCl₄ = Carbon tetrachloride
$^b$C₄Cl₆ = Hexachlorobutadiene-1,3
$^c$HPB = "Hexpot bottoms" having a composition of carbon tetrachloride 1.79 wt. %; perchloroethylene 1.38 wt. %; hexachloroethane 5.78 wt. %; hexachlorobutadiene-1,3 25.79 wt. %; Hexachlorobenzene 65.26 wt. %
$^d$Type X zeolite having a 13 Angstrom pore size (4 to 8 mesh beads)
$^e$Type Y zeolite having a 13 Angstrom pore size (⅛ in. pellets)

As may be seen from TABLE I, the process of the present invention may be used to recover substantially all (up to about 100 percent in a number of runs) of the chlorine content of chlorocarbons including heavy residual still "hex pot bottoms".

EXAMPLE II

A series of runs at a pressure of approximately one atmosphere (absolute) were made utilizing various chlorocarbon feed materials in a fixed bed cylindrical reactor having a diameter of about 2.5 cm. with about 120 cm. deep catalyst bed of copper exchanged synthetic crystalline zeolite particles. The amount of exchanged copper as well as the type of zeolite was also varied. The reactor was equipped with a thermowell in the center of the catalyst bed, thus providing a means for determining the temperature over the length of the catalyst bed. The reactor conditions and percentages (theoretical) of chlorine recovered from the feed are shown in TABLE II below.

TABLE II (Fixed Bed)

| Run No. | Feed | Feed Rate moles/min. | $O_2$/C Ratio | Average Reaction Zone Temp. °C | Residence Time, sec. | Catalyst % wt. Cu (II) loading/type zeolite support | % (theoretical) $Cl_2$ Recovered |
|---|---|---|---|---|---|---|---|
| 1 C | $CCl_4$[a] | 0.001680 | 1.46/1 | 384 | 56 | 0.49%/4A[e] | 73.5 |
| 2 C | " | 0.002590 | 1.43/1 | 357 | 39.3 | " | 56.8 |
| 3 C | " | 0.001766 | 1.39/1 | 344 | 60.3 | " | 54.2 |
| 4 C | " | 0.002296 | 1.32/1 | 348 | 48.1 | " | 42.8 |
| 5 | " | 0.002978 | 1.10/1 | 384 | 42.3 | 1.40/13X[f] | 94.5 |
| 6 | " | 0.001393 | 1.77/1 | 369 | 60.6 | " | 86.8 |
| 7 | $C_4Cl_6$[b] | 0.001087 | 2.06/1 | 464 | 40.5 | " | 83.7 |
| 8 C | " | 0.001318 | 1.99/1 | 444 | 46.4 | " | 74.1 |
| 9 C | " | 0.001048 | 3.08/1 | 534 | 34.8 | " | 40.0 |
| 10 C | " | 0.000768 | 4.42/1 | 467 | 32.5 | 7.08/4A[e] | 80.9 |
| 11 | " | 0.001115 | 0.98/1 | 457 | 56.4 | " | 81.0 |
| 12 | " | 0.001187 | 1.13/1 | 472 | 49.5 | " | 88.7 |
| 13 | " | 0.000906 | 3.35/1 | 419 | 56.9 | 4.91/13X[f] | 99.7 |
| 14 | " | 0.002170 | 1.39/1 | 424 | 51.3 | " | 87.3 |
| 15 C | " | 0.002540 | 1.77/1 | 435 | 35.6 | " | 73.8 |
| 16 | " | 0.001318 | 3.95/1 | 442 | 32.2 | " | 117.7 |
| 17 | $C_6Cl_6$[c] | 0.000527 | 4.59/1 | 444 | 47.3 | " | 77.4 |
| 18 | " | 0.000778 | 3.11/1 | 460 | 46.9 | " | 93.0 |
| 19 | HPB[d] | 0.000428 | 1.04/1 | 467 | 93.9 | 4.72/13Y[g] | 90.9 |
| 20 | " | 0.000373 | 1.52/1 | 455 | 78.4 | " | 99.5 |

[a]$CCl_4$ = Carbon tetrachloride
[b]$C_4Cl_6$ = Hexachlorobutadiene-1,3
[c]$C_6Cl_6$ = Hexachlorobenzene
[d]HPB = "Hexpot bottoms" having a composition of
    Carbon tetrachloride    1.79 wt %
    Perchloroethylene    1.38 wt %
    Hexachloroethane    5.78 wt %
    Hexachlorobutadiene-1,3    25.79 wt %
    Hexachlorobenzene    65.26 wt %
[e]4A = type A molecular sieve having a pore size of 4 Angstroms (⅛ in. dia. extrusions)
[f]13X = type X molecular sieve having a pore size of 13 Angstoms (4 to 8 mesh beads)
[g]13Y = type Y molecular sieve having a pore size of 13 Angstroms (⅛ in. pellets)

As may be seen from the data, the process of the present invention offers a substantial opportunity to recover the chlorine which often is lost in the disposal of waste chlorohydrocarbons.

As a matter of information, it is noted that: In runs 3 and 4, considerable phosgene ($COCl_2$) was produced which has been attributed mainly to low reaction zone temperatures. The higher operating temperatures in runs 5 and 6 virtually eliminated phosgene formation. Measurement of the effluent in run 15 indicated that some unreacted feed was in the effluent, indicating that either the residence time and/or insufficient oxygen were present for complete reaction. The subsequent run, run 16, showed an extremely high recovery, greater than 100%, most likely due to the buildup of hexachlorobutadiene-1,3 and hexachlorobenzene during the previous run (run 15). This material was then presumably burned off under the influence of the higher temperatures and higher oxygen to carbon ratio of run 16. A faulty line for the hexachlorobenzene was found in run 17, which accounted for the low recovery. Also, in run 18, a faulty valve stem on the liquid feed line was believed to be responsible for the less than 100% recovery of chlorine from the feed.

EXAMPLE III

Another series of runs were made in accordance with EXAMPLE I (the fluidized-bed reactor) except with varying catalyst materials. The specific run conditions, catalysts and results obtained are shown below in TABLE III.

TABLE III

| Run No. | Feed | Feed Rate × $10^{-3}$ moles/min. | $O_2$/C Ratio | Average Reaction Zone Temp. °C | Residence Time, sec. | Catalyst Weight percent/ metal/Support | % (theoretical) $Cl_2$ Recovered | Oxidant |
|---|---|---|---|---|---|---|---|---|
| 1C | $CCl_4$[a] | 1.139 | 1.48/1 | 380 | 10.4 | 7.07 Cu (II)/Florex[b] | 45.6 | — |
| 2C | " | 1.128 | " | 441 | 8.4 | " | 63.1 | — |
| 3 | " | — | " | 493 | 7.9 | " | 91.1 | — |
| 4 | " | — | " | 544 | 7.4 | " | 97.9 | — |
| 5C | $C_4Cl_6$[c] | 2.795 | 5.97/1 | 476 | 10.4 | 4.89 Mn/13X[g] | ~50 | $O_2$ |
| 6 | " | 2.858 | 5.84/1 | 530 | 9.7 | " | 88.5 | " |
| 7 | " | 2.861 | 1.30/1 | 490 | 9.6 | 1.38Fe/13X[g] | 88.1 | Air |
| 8 | " | 2.838 | 1.31/1 | 456 | 10.1 | 1.79 Cu/HFZ-20[d] | 97.3 | " |
| 9 | " | 3.440 | 1.08/1 | 463 | 9.9 | " | 88[e] | " |
| 10C | " | 2.333 | 1.59/1 | 480 | 9.4 | 8.36 Cu+5.51 KCl/$Al_2O_3$[h] 9.3 | Air | |
| 11C | " | 2.867 | 1.05/1 | 463 | 9.1 | 7.21 Cu/13X[g] | 70.4 | " |
| 12 | " | 2.853 | 1.14/1 | 463 | 10.5 | 2.91 C/HFZ20[d] | 96.4[f] | " |

[a]$CCl_4$ = Carbon tetrachloride
[b]Florex = Calcined Fuller's earth, 60–400 mesh, manufactured by Floridian Corporation. This catalyst also contained 4.65 percent potassium as KCl.
[c]$C_4Cl_6$ = Hexachlorobutadiene-1,3
[d]HFZ-20 = Fluidizeable zeolite material manufactured by Air Products Corporation
[e]Catalyst activity ceased during the run. The temperature was raised in an attempt to restart the reaction. The 88% recovery was obtained prior to the activity cessation.
[f]Unexplained loss of catalytic activity after about 7 hrs. run time. The 96.4% recovery was obtained prior to the loss.
[g]Type X zeolite having 13 Angstroms pore size, 50–200 mesh
[h]Activated alumina, 190 sq. meters/g surface area, average particle size of 65 microns

COMPARATIVE EXAMPLE A

Comparative runs outside the scope of the present invention were made on the fixed-bed reactor of Example II with synthetic crystalline type 13Y zeolite particles which had not been cooper-exchanged. The operating conditions and results obtained are shown below in TABLE IV. As may be seen, the amount of chlorine recovered is generally low even at the relatively high reaction zone temperature of 510° C.

TABLE IV (comparative)

| Run No. | Feed | Feed Rate ×10⁻³ moles/min. | $O_2$/C Ratio | Average Reaction Zone Temp. °C | Residence Time, sec. | Catalyst | % (theoretical) $Cl_2$ Recovered | Oxidant |
|---|---|---|---|---|---|---|---|---|
| 1C | $C_4Cl_6$ᵃ | 2.000 | 1.51/1 | 451 | 50.0 | 13Yᵇ | 49.5 | $O_2$ |
| 2C | " | 1.248 | 2.42/1 | 457 | 52.5 | " | 59.0 | " |
| 3C | HPBᶜ | 0.4434 | 1.77/1 | 510 | 53 | " | 77.7 | " |

ᵃ$C_4Cl_6$ = Hexachlorobutadiene-1,3
ᵇType Y zeolite having a pore size of 13 Angstroms (⅛ in. pellets)
ᶜHPB = hexpot bottoms (see Table 1 for composition)

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

I claim:

1. A catalytic oxidation process for the recovery of chlorine from chlorocarbon compounds consisting of carbon and chlorine, which process consists essentially of catalytically oxidizing a feed consisting essentially of chlorocarbon compounds by reacting the feed with at least a stoichiometric amount of oxygen present in the process as molecular oxygen or molecular oxygen-containing gas at a reaction temperature of below about 500° C, in the presence of at least one transition metal-containing supported catalyst for a time sufficient to recover substantially all of the chlorine from the chlorocarbon compound feed.

2. A process according to claim 1 wherein the transition metal is copper, iron, or manganese.

3. A process according to claim 2 wherein the reaction temperature is between about 300° and 500° C and a superficial reaction zone residence time of 5 seconds to 100 seconds and a reaction zone pressure of about 0.5 atmospheres to 15 atmospheres absolute are maintained.

4. A process according to claim 1 wherein the supported catalyst is a transition-metal exchanged zeolite.

5. A process according to claim 4 wherein the transition metal is copper, iron, or manganese.

6. A process according to claim 5 wherein the reaction temperature is between about 300° and 500° C and a superficial reaction zone residence time of 5 seconds to 100 seconds and a reaction zone pressure of about 0.5 atmospheres to 15 atmospheres absolute are maintained.

7. A process according to claim 4 wherein the reaction temperature is between about 300° and 500° C and a superficial reaction zone residence time of 5 seconds to 100 seconds and a reaction zone pressure of about 0.5 atmosphere to 15 atmospheres absolute are maintained.

8. A process according to claim 1 wherein the transition metal is copper, iron, or manganese.

9. A process according to claim 8 wherein the reaction temperature is between about 300° and 500° C and a superficial reaction zone residence time of 5 seconds to 100 seconds and a reaction zone pressure of about 0.5 atmospheres to 15 atmospheres absolute are maintained.

10. A process according to claim 1 wherein the supported catalyst is a transition-metal exchanged zeolite.

11. A process according to claim 10 wherein the transition metal is copper, iron, or manganese.

12. A process according to claim 11 wherein the reaction temperature is between about 300° and 500° C and a superficial reaction zone residence time of 5 seconds to 100 seconds and a reaction zone pressure of about 0.5 atmosphere to 15 atmospheres absolute are maintained.

13. A process according to claim 10 wherein the reaction temperature is between about 300° and 500° C and a superficial reaction zone residence time of 5 seconds to 100 seconds and a reaction zone pressure of about 0.5 atmospheres absolute are maintained.

14. A catalytic oxidation process for the recovery of chlorine from chlorocarbon compounds consisting of carbon and chlorine, which process consists essentially of catalytically oxidizing a feed consisting essentially of chlorocarbon compounds of from one to twenty carbon atoms by reacting the chlorocarbon feed with at least a stoichiometric amount of oxygen present in the process as molecular oxygen or molecular oxygen-containing gas at a reaction temperature of between about 300° and 500° C, in the presence of at least one copper-containing supported catalyst for a time sufficient to recover substantially all of the chlorine from the chlorocarbon compound feed.

15. A process according to claim 14 wherein the supported catalyst is copper-exchanged zeolite.

16. A process according to claim 14 wherein the chlorinated organic compound feed consists essentially of hexachlorobenzene, hexachlorobutadiene and hexachloroethane.

17. A process according to claim 16 wherein the reaction temperature is between about 300° and 500° C and a superficial reaction zone residence time of about 5 seconds to 50 seconds is maintained and wherein the supported catalyst is copper-exchanged zeolite A, X or Y.

18. A catalytic oxidation process for the recovery of chlorine from a chlorocarbon feed mixture, which process comprises forming a chlorocarbon feed mixture consisting essentially of hexachlorobenzene, hexachlorobutadiene and hexachloroethane, passing the chlorocarbon feed mixture and more than a stoichiometric amount of oxygen relative to the chlorocarbons into a reactive zone containing a fluidized bed consisting essentially of at least one transition metal-containing supported catalyst in particulate fluidizable form, a catalytic amount of the catalyst being supported on a carrier having a surface area of at least about 50 $m^2/gm$, and maintaining a superficial inear velocity of the chlorocarbon and oxygen or the oxygen-containing gas fed into the reaction zone above minimum fluidization velocity for the fed and a reaction zone temperature between about 300° and 500° C and a reaction zone pressure between about 0.5 atm and about 10 atm (absolute) for a superficial reaction zone residence time of between about 2 seconds and two minutes and sufficient to oxidize essentially all of the chlorocarbon feed mixture to chlorine and carbon dioxide reaction products.

19. A process according to claim 18 wherein the supported catalyst is copper-exchanged zeolite A, X or Y.

20. A catalytic oxidation process for the recovery of chlorine from a chlorocarbon feed stream which process consists essentially of catalytically oxidizing a chlorocarbon feed consisting essentially of hexachlorobenzene, hexachlorobutadiene and hexachloroethane with at least a stoichiometric amount of oxygen present in the process as molecular oxygen or molecular oxygen containing gas and in the presence of at least one transition metal supported catalyst and at a reaction time and temperature below about 500° C sufficient to oxidize essentially all of the chlorocarbon feed to reaction products consisting essentially of chlorine and carbon dioxide.

* * * * *